US012643662B2

(12) United States Patent
Cho et al.

(10) Patent No.: US 12,643,662 B2
(45) Date of Patent: Jun. 2, 2026

(54) SEAT SYSTEM FOR AIRPLANE

(71) Applicants:Young Seo Cho, Paju-si (KR); Young Jai Cho, Paju-si (KR)

(72) Inventors: Young Seo Cho, Paju-si (KR); Young Jai Cho, Paju-si (KR)

( * ) Notice: Subject to any disclaimer, the term of this patent is extended or adjusted under 35 U.S.C. 154(b) by 0 days.

(21) Appl. No.: 18/228,585

(22) Filed: Jul. 31, 2023

(65) Prior Publication Data

US 2025/0042548 A1      Feb. 6, 2025

(51) Int. Cl.
B64D 11/06 (2006.01)
(52) U.S. Cl.
CPC ...... B64D 11/0601 (2014.12); B64D 11/0605 (2014.12); B64D 11/0606 (2014.12)
(58) Field of Classification Search
CPC ............ B64D 11/0601; B64D 11/0605; B64D 11/0606; B64D 11/0602; B64D 11/0646; B64D 11/0069
See application file for complete search history.

(56) References Cited

U.S. PATENT DOCUMENTS

| | | | | |
|---|---|---|---|---|
| 6,073,883 | A * | 6/2000 | Ohlmann | B64D 11/00 244/118.6 |
| 7,077,360 | B2 * | 7/2006 | Jacob | B64D 11/00 244/118.5 |
| 7,837,262 | B2 * | 11/2010 | Merensky | B61D 31/00 5/118 |
| 10,589,836 | B2 * | 3/2020 | Sankrithi | B64C 1/20 |
| 2003/0029967 | A1 * | 2/2003 | Mills | B64D 11/00 244/118.5 |
| 2006/0192050 | A1 * | 8/2006 | Cheung | B64D 11/064 244/118.6 |
| 2007/0170310 | A1 * | 7/2007 | Bock | B64D 11/0604 244/118.5 |
| 2013/0119203 | A1 * | 5/2013 | Dupont | B64C 1/18 244/137.2 |
| 2017/0233057 | A1 | 8/2017 | Charles et al. | |
| 2018/0265201 | A1 | 9/2018 | Carlosz et al. | |
| 2022/0371737 | A1 * | 11/2022 | O'Neill | B61D 1/04 |

FOREIGN PATENT DOCUMENTS

| | | |
|---|---|---|
| JP | 2012-116469 A | 6/2012 |
| KR | 1020140039182 A | 4/2014 |

* cited by examiner

*Primary Examiner* — Joshua D Huson
*Assistant Examiner* — Vicente Rodriguez
(74) *Attorney, Agent, or Firm* — Heedong Chae; Lucem, PC

(57) ABSTRACT

Disclosed is a seat system for an airplane. A seat system for an airplane according to the present disclosure includes: a first seat unit provided at a first bottom portion of an airplane body and having a plurality of first heat bodies; a second seat unit provided at a second bottom portion disposed at an upper portion of the first bottom portion and having a plurality of second seat bodies; and a third seat unit provided at the second bottom portion and disposed to be spaced apart from the second seat unit, and the third seat unit includes a first accommodation body provided at the second bottom portion and a third seat body provided inside the first accommodation body and provided as a seat of a user.

4 Claims, 7 Drawing Sheets

SEAT SYSTEM FOR AIRPLANE

BACKGROUND OF THE INVENTION

Field of the Invention

The present disclosure relates to a seat system, and more particularly, to a seat system for an airplane, which improves the arrangement of seats on an airplane body to increase space efficiency, and as well as, enables passengers to visually receive a stability sense and luxurious feeling about a room space.

Description of the Related Art

Airplanes refer to objects that can fly in the air while loading people or things using a lift of a fixed wing.

Such airplanes can be divided into various types, depending on a purpose, a propulsion device, and the form of the wing.

Passenger planes among the airplanes have a purpose of transporting people and possess at least 20 to at most 800 seats. For reference, airplanes having 20 seats or less call a commuter plane or air taxi.

The seats of the passenger planes are generally divided into first, business, and economy classes.

The classes are classified according to a space of the seat and a grade of a service.

That is, the first class also referred to as a sleeper seat, and the seat is stretched at 180 degrees and can a take a lying posture, and in the business class, passengers cannot lie down like the first class, but an interval from a front seat is wide, so the passengers can stretch legs and take a comfortable posture.

Unlike this, the economy class is less expensive, but lower convenient than the first class.

Meanwhile, the conventional first class and the business seat cannot create a lot of demands at higher seat prices than the economy class because a required space of the seat is large.

In addition, an idea of conventional multi-layered seats is high in space efficiency, but it is burdensome to accept the idea in terms of an airline about an airplane's room interior, so an improvement therefor is required.

The above-described technical configuration is a background technique for assisting the understanding of the present disclosure, and does not mean a conventional technology widely known in the art to which the present disclosure belongs.

SUMMARY OF THE INVENTION

Accordingly, a technical object to be achieved by the present disclosure is to provide a seat system for an airplane, which improves the arrangement of seats on an airplane body to increase space efficiency, and as well as, enables passengers to visually receive a stability sense and luxurious feeling about a room space.

According to an exemplary embodiment of the present disclosure, a seat system for an airplane may be provided, which includes: a first seat unit provided at a first bottom portion of an airplane body and having a plurality of first heat bodies; a second seat unit provided at a second bottom portion disposed at an upper portion of the first bottom portion and having a plurality of second seat bodies; and a third seat unit provided at the second bottom portion and disposed to be spaced apart from the second seat unit, in which the third seat unit includes a first accommodation body provided at the second bottom portion and a third seat body provided inside the first accommodation body and provided as a seat of a user.

According to another exemplary embodiment of the present disclosure, a seat system for an airplane may be provided, which includes: a first seat unit provided at a first bottom portion of an airplane body and having a plurality of first heat bodies; a second seat unit provided at a second bottom portion disposed at an upper portion of the first bottom portion and having a plurality of second seat bodies; and a fourth seat unit provided at a third bottom portion of the second bottom portion and disposed to be spaced apart from the second seat unit, in which the fourth seat unit includes a second accommodation body provided at the third bottom portion and a fourth seat body provided inside the second accommodation body and provided as the seat of the user.

The first accommodation body may include a first side wall disposed to be vertical to a plane head direction of the airplane body, a first rear wall of which one portion is connected to the first side wall, a second side wall connected to the first rear wall and disposed to be parallel to the first side wall, and a first body door coupled to any one of the first side wall and the second side wall to be openable/closable.

The third seat unit may further include a seat step provided at a first body bottom portion of the first accommodation body to be disposed in front of the third seat body.

The third seat unit may further include a first support post provided in the first accommodation body.

The third seat unit may further include a monitor and a table provided in the first accommodation body.

The second accommodation body may include a third side wall disposed to be vertical to a plane head direction of the airplane body, a second rear wall of which one portion is connected to the third side wall, a fourth side wall connected to the second rear wall and disposed to be parallel to the third side wall, and a second body door coupled to any one of the third side wall and the fourth side wall to be openable/closable.

The fourth seat unit may further include a second support post provided in the second accommodation body.

The fourth seat unit may further include the monitor and the table provided in the second accommodation body.

The second seat unit may further include the plurality of second seat bodies at the third bottom portion.

The seat system may further include a second step connecting the second bottom portion and the third bottom portion.

According to exemplary embodiments of the present disclosure, space efficiency can be increased by arranging first to fourth seat units.

Further, passengers can receive a stability sense and a luxurious feeling visually about a room space.

Furthermore, an aviation seat having a rational price can be provided to customers.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
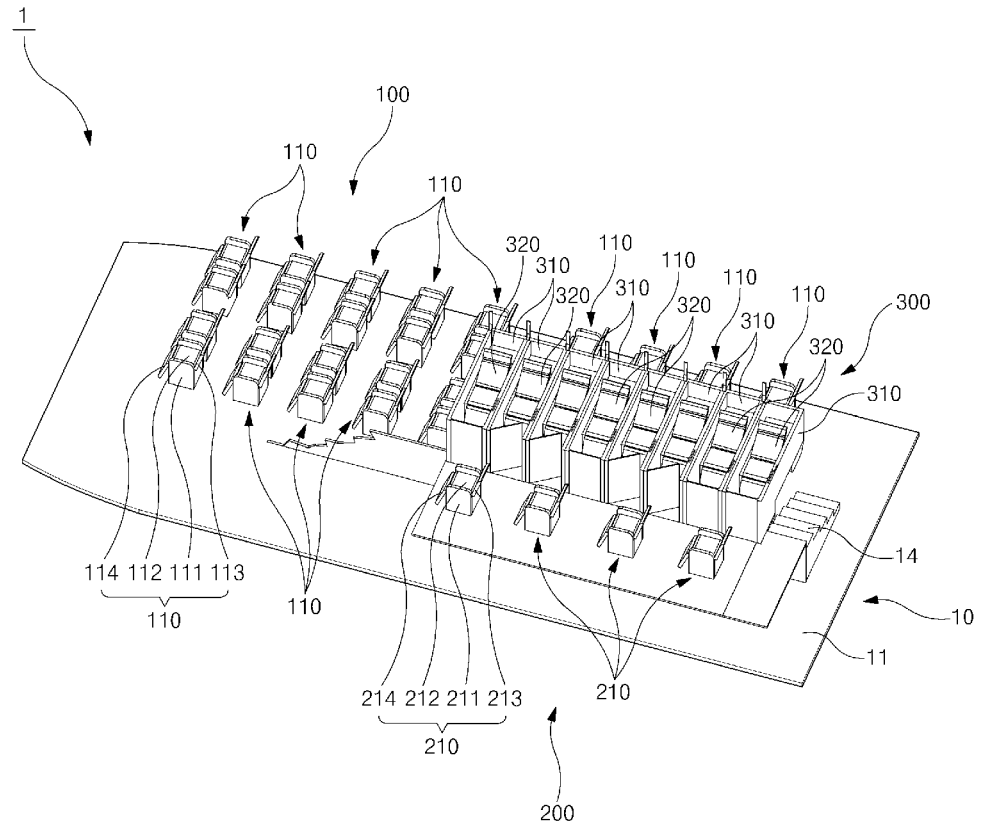
FIG. 1 is a perspective view schematically illustrating a seat system for an airplane according to an exemplary embodiment of the present disclosure.

In order to sufficiently appreciate the present disclosure, operational advantages of the present disclosure, objects achieved by exemplary embodiments the present disclosure, accompanying drawings illustrating the exemplary embodiments of the present disclosure and contents disclosed in the accompanying drawings should be referred.

Hereinafter, by describing a preferred exemplary embodiment of the present disclosure with reference to the accompanying drawings, the present disclosure will be described in detail. Like reference numerals illustrated in the respective drawings designate like members.

Figure 2:
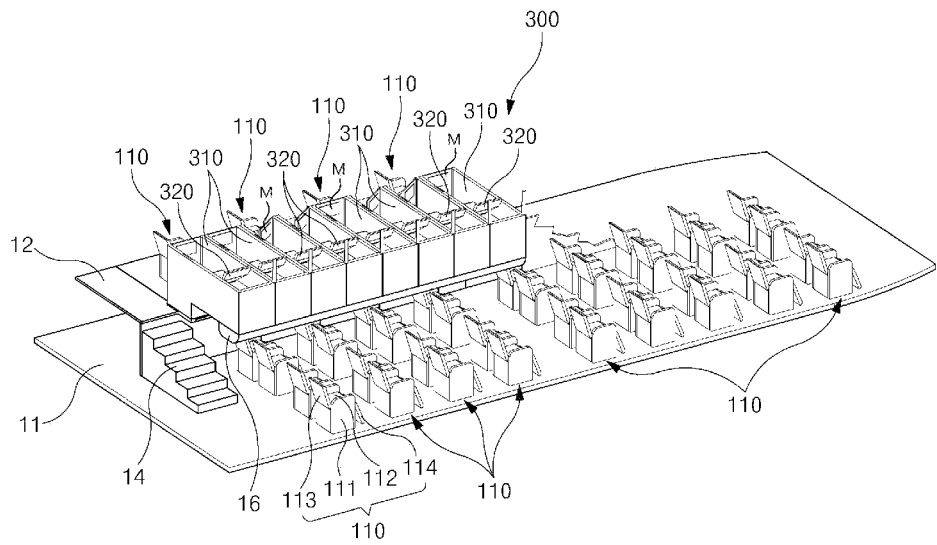
FIG. 2 is a bottom perspective view of FIG. 1.
Figure 3:
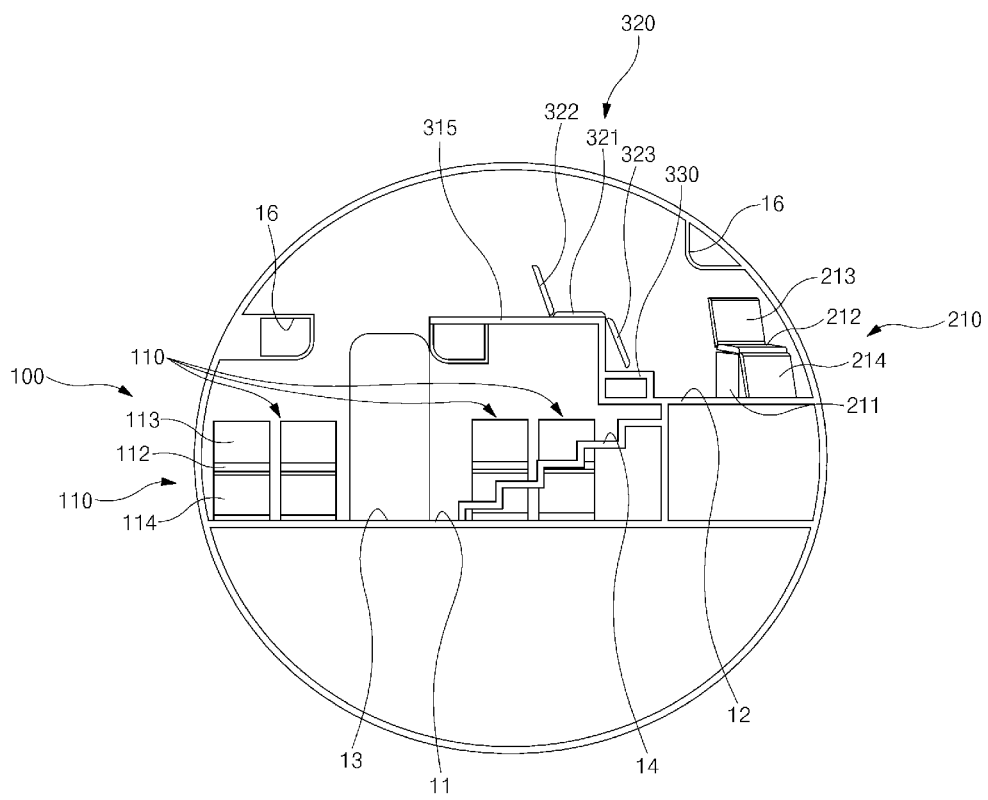
FIG. 3 is a front cross-sectional view schematically illustrating that the seat system for the air plane illustrated in FIG. 1 is disposed in an airplane body.
Figure 4:
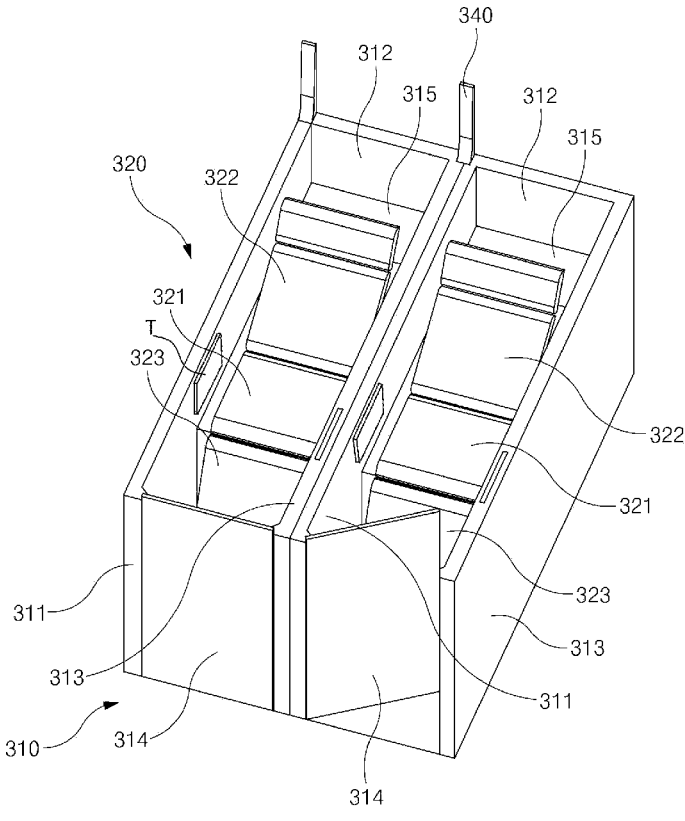
FIG. 4 is a perspective view schematically illustrating a first accommodation body and a first seat body illustrated in FIG. 1.

FIG. 1 is a perspective view schematically illustrating a seat system for an airplane according to an exemplary embodiment of the present disclosure, FIG. 2 is a bottom perspective view of FIG. 1, FIG. 3 is a front cross-sectional view schematically illustrating that the seat system for the air plane illustrated in FIG. 1 is disposed in an airplane body, and FIG. 4 is a perspective view schematically illustrating a first accommodation body and a first seat body illustrated in FIG. 1.

As illustrated in the drawings, the seat system 1 for an airplane according to the exemplary embodiment includes a first seat unit 100 provided at a first bottom portion 11 of an airplane body 10 and having a plurality of seat bodies, a second seat unit 200 provided at a second bottom portion 12 disposed at an upper portion of the first bottom portion 11 and having a plurality of second seat bodies 200, and a third seat unit 300 provided at the second bottom portion 12 and disposed to be spaced apart from the second seat unit 200.

As illustrated in FIG. 1, the first seat unit 100 includes a plurality of first seat bodies 110 arranged in a straight line toward a plane tail from a plane head of the airplane. In FIG. 1, a horizontal width of the plane head direction is illustrated to be narrow, and the horizontal width of the plane tail direction is illustrated to be larger than that of the plane head direction.

In the exemplary embodiment, the first seat bodies 110 may be arranged in four rows in the plane tail direction from the plane head based on FIG. 1. Further, in the exemplary embodiment, the first seat body 110 may be disposed only at the first bottom portion 11 which is a lower area of a third seat unit 300 as illustrated in FIG. 1. That is, the first seat body 110 may not be disposed at the first bottom portion 11 of the lower area of the second seat unit 200.

In the exemplary embodiment, as illustrated in FIG. 1, the first seat body 110 includes a first support body 111 coupled to the first bottom portion 11, a first hip support body 112 coupled to an upper portion of the first support body 111 and supporting a hip of the passenger, a first back support body 113 coupled to the first hip support body 112 to be angle-adjusted and supporting a back or a head of the passenger, and first leg support body 114 coupled to the first hip support body 112 and supporting a leg of a user.

In the exemplary embodiment, as illustrated in FIG. 3, a first corridor 13 is provided between the plurality of first seat bodies 110, so the passenger may move through the first corridor 13. In the exemplary embodiment, the first corridor 13 may be disposed between a pair of first seat bodies 110.

As illustrated in FIG. 1, the second seat unit 200 may be provided at the second bottom portion 12 of the airplane body 10, and the second bottom portion 12 may be disposed at the upper portion of the first bottom portion 11. In the exemplary embodiment, the passenger may move through a first step 14 connecting the first bottom portion 11 and the second bottom portion 12.

In the exemplary embodiment, as illustrated in FIG. 1, the second seat unit 200 includes a plurality of second seat bodies 210 arranged at the second bottom portion 12 in the straight line toward the plane tail from the plane head of the airplane. In the exemplary embodiment, the plurality of second seat bodies 210 may be disposed to be vertical to the third seat unit 300 as illustrated in FIG. 1.

In the exemplary embodiment, as illustrated in FIG. 1, the second seat unit 200 includes a second support body 211 coupled to the second bottom portion 12, a second hip support body 212 coupled to an upper portion of the second support body 212 and supporting the hip of the passenger, a second back support body 213 coupled to the second hip support body 212 to be angle-adjusted and supporting the back or the head of the passenger, and a second leg support body 214 coupled to the second hip support body 212 and supporting the leg of the user.

In the exemplary embodiment, the second seat body 210 may be provided with a smaller number than the third seat body 320 by considering a free space of the second bottom portion 12 and a price of the seat.

As illustrated in FIG. 1, the third seat unit 300 includes a first accommodation body 310 provided at the second bottom portion 12, a third seat body 320 provided inside the first accommodation space 310 and provided as the seat of the user, a seat step 330 provided at a first body bottom portion 315 of the first accommodation body 310 to be disposed in front of the third seat body 320, and a first support post 340 provided in the first accommodation body 310.

As illustrated in FIG. 4, the first accommodation body 310 of the third seat unit 300 includes a first side wall 311 disposed to be vertical to the plane head direction of the airplane body 10, a first rear wall 312 of which one portion is connected to the first side wall 311, a second side wall 313 connected to the first rear wall 312 and disposed to be parallel to the first side wall 311, a first body door 314 to any one of the first side wall 311 and the second side wall 313 to be openable/closable, and a first body bottom portion 315 to which an upper surface portion is coupled to the third seat body 320.

In the exemplary embodiment, as illustrated in FIG. 2, a monitor M may be provided in the first body door 314. In the exemplary embodiment, the monitor M is not limited to the first body door 314, and may be provided at an arbitrary area of the first accommodation body 310.

In the exemplary embodiment, as illustrated in FIG. 4, a table T may be provided on the first side wall 311. In the exemplary embodiment, the table T may have a known coupling means to be slidably coupled or hinge-coupled.

The monitor M and the table T may also be similarly applied to embodiments to be described below.

As illustrated in FIG. 4, the third seat body 320 of the third seat unit 300 includes a third hip support body 321, a third back support body 322 coupled to the third hip support body 321 to be angle-adjusted and supporting the back or the head of the passenger, and a third leg support body 323 coupled to the third hip support body 321 and supporting the leg of the user.

In the exemplary embodiment, as illustrated in FIGS. 1 and 2, the third seat unit 300 may be provided to be disposed at an upper area of the first seat unit 100.

In the exemplary embodiment, a passenger who sits on the third seat body 320 may be protected with a privacy from a passenger who sits on the third seat body 320 disposed next by the first accommodation body 310. Further, the passenger who sits on the third seat body 320 may be protected with the privacy from a passenger who sits on the second seat body 210 disposed in front by the first accommodation body 310.

In the exemplary embodiment, as illustrated in FIG. 3, a plurality of shelf boxes 16 may be provided in the airplane body 10.

Further, in the exemplary embodiment, as illustrated in FIG. 1, a first partition 17 may be provided at the first bottom portion 11 in the plane head direction.

Figure 5:
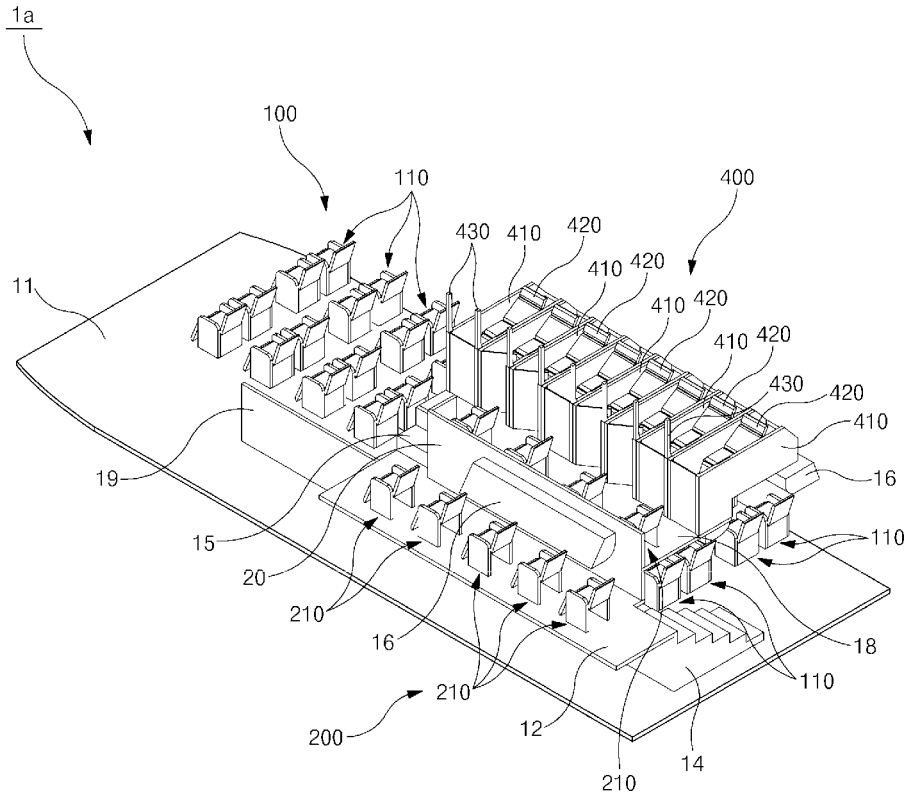
FIG. 5 is a perspective view schematically illustrating a seat system for an airplane according to another embodiment of the present disclosure.
Figure 6:
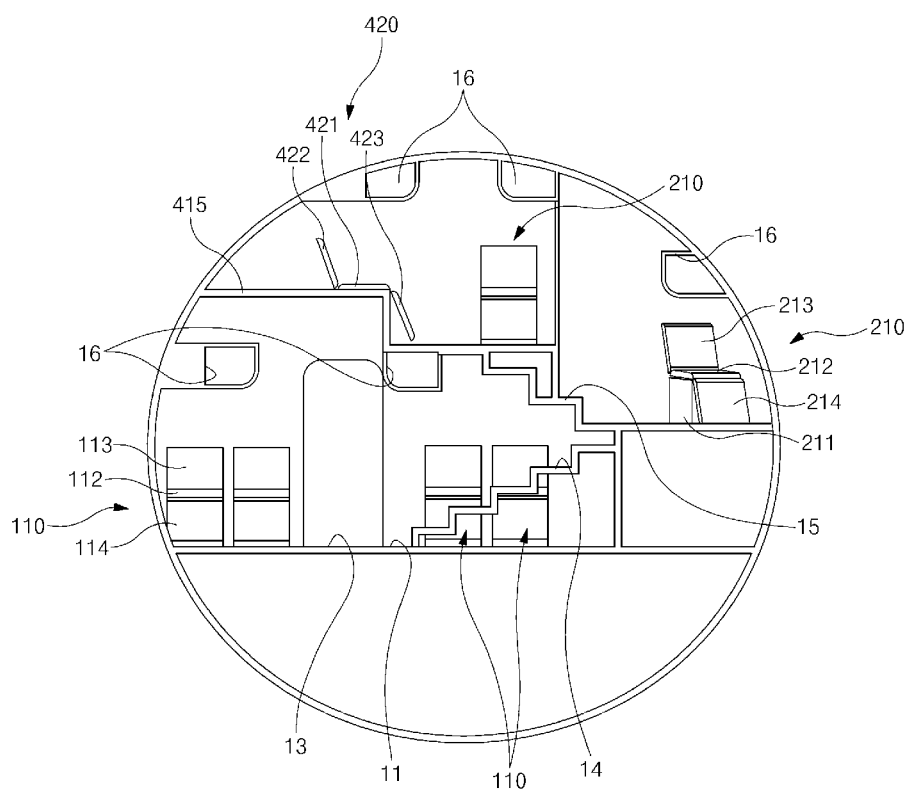
FIG. 6 is a front cross-sectional view schematically illustrating that the seat system for the air plane illustrated in FIG. 5 is disposed in the airplane body.
Figure 7:
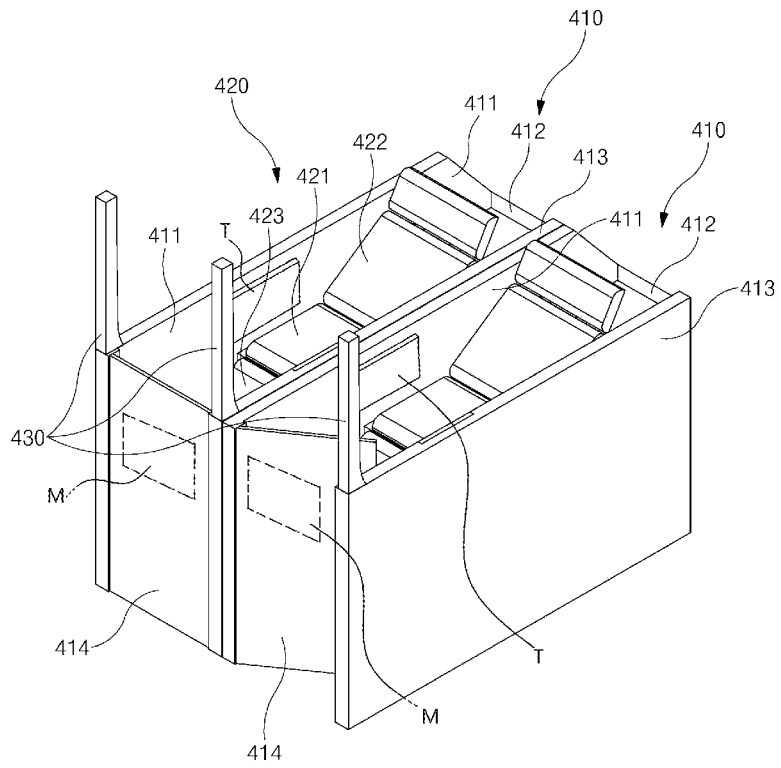
FIG. 7 is a perspective view schematically illustrating a second accommodation body and a fourth seat body illustrated in FIG. 5.

FIG. 5 is a perspective view schematically illustrating a seat system for an airplane according to another embodiment of the present disclosure, FIG. 6 is a front cross-sectional view schematically illustrating that the seat system for the air plane illustrated in FIG. 5 is disposed in the airplane body, and FIG. 7 is a perspective view schematically illustrating a second accommodation body and a fourth seat body illustrated in FIG. 5.

As illustrated in FIG. 5, the seat system 1a for an airplane according to the exemplary embodiment includes a first seat unit 100 provided at a first bottom portion 11 of an airplane body 10 and having a plurality of seat bodies, a second seat unit 200 provided at a second bottom portion 12 disposed at an upper portion of the first bottom portion 11 and having a plurality of second seat bodies 200, and a fourth seat unit 400 disposed at the third bottom portion 18 disposed at the upper portion of the second bottom portion 12 and disposed to be spaced apart from the second seat unit 200.

The configuration of the first seat unit 100 of the exemplary embodiment may be applied to the first seat unit 100 as it is.

In the exemplary embodiment, as illustrated in FIG. 5, a second partition 19 may be provided at the first seat body 110 disposed in the plane head direction.

The configuration of the second seat unit 200 of the exemplary embodiment may also be applied to the second seat unit 200 as it is.

In the exemplary embodiment, the second seat body 210 provided at the third bottom portion 18 may be provided in the straight line toward the plane tail from the plane head as illustrated in FIG. 5.

Further, in the exemplary embodiment, the second seat body 210 provided at the third bottom portion 18 may be spatially separated from the second seat body 210 provided at the second bottom portion 12 by a third partition 20 provided at the second bottom portion 12 as illustrated in FIG. 5.

As illustrated in FIG. 5, the fourth seat unit 400 includes a second accommodation body 410 provided at the third bottom portion 18, a fourth seat body 420 provided inside the second accommodation space 410 and provided as the seat of the user, and a second support post 430 provided in the second accommodation body 410.

As illustrated in FIG. 7, the second accommodation body 410 includes a third side wall 411 disposed to be vertical to the plane head direction of the airplane body 10, a second rear wall 412 of which one portion is connected to the third side wall 411, a fourth side wall 413 connected to the second rear wall 412 and disposed to be parallel to the third side wall 411, and a second body door 414 to any one of the third side wall 411 and the fourth side wall 413 to be openable/closable.

In the exemplary embodiment, as illustrated in FIG. 7, the monitor M may be provided in the second body door 414, and the table T may be provided on the third side wall 411.

As illustrated in FIG. 6, the fourth seat body 420 of the fourth seat unit 400 includes a fourth hip support body 421 provided at the second body bottom portion 415 of the second accommodation body 410 and supporting the hip of the user, a fourth back support body 422 coupled to the fourth hip support body 421 to be angle-adjusted and supporting the back or the head of the passenger, and a fourth leg support body 423 coupled to the fourth hip support body 421 and supporting the leg of the user.

A second support post 430 of the fourth seat unit 400 may be provided on the third side wall 411 and the fourth side wall 413 as illustrated in FIG. 7.

Meanwhile, in the exemplary embodiment, the passenger may move to the second bottom portion 12 or the third bottom portion 18 through a second step 15 connecting the second bottom portion 12 and the third bottom portion 18.

As described above, the present disclosure is not limited to the exemplary embodiments described herein, and it would be apparent to those skilled in the art that various changes and modifications might be made without departing from the spirit and the scope of the present disclosure. Therefore, it will be determined that the changed examples or modified examples are included in the appended claims of the present disclosure.

DESCRIPTION OF SYMBOLS 1,1a: seat system
100: first seat unit
110: first seat body
111: first support body
112: first hip support body
113: first back support body
114: first leg support body
200: second seat unit
210: second seat body
211: second support body
212: second hip support body
213: second back support body
214: second leg support body
300: third seat unit
310: first accommodation body
311: first side wall
312: first rear wall
313: second side wall
314: first body door
315: first body bottom portion
320: third seat body
321: third hip support body
322: third back support body
323: third leg support body
330: seat step
340: first support post

7

400: fourth seat unit
410: second accommodation body
411: third side wall
412: second rear wall
413: fourth side wall
414: second body door
415: second body bottom portion
420: fourth seat body
421: fourth hip support body
422: fourth back support body
423: fourth leg support body
430: second support post
10: airplane body
11: first bottom portion
12: second bottom portion
13: first corridor
14: first step
15: second step
16: shelf box
17: first partition
18: third bottom portion
19: second partition
20: third partition

What is claimed is:

1. A seat system for an airplane, comprising:

a first seat unit provided at a first bottom portion of an airplane body and having a plurality of first seat bodies such that the plurality of the first seat bodies forms a first corridor;

a second seat unit provided at a second bottom portion disposed above the first bottom portion and having a plurality of second seat bodies; and a fourth seat unit provided at a third bottom portion disposed above the second bottom portion and disposed to be spaced apart from the second seat unit, wherein the fourth seat unit includes a second accommodation body formed to upwardly extend from both of the third bottom portion and a second body bottom portion and a fourth seat body provided inside the second accommodation body and provided as the seat of the user,

wherein the second seat unit further includes the plurality of second seat bodies at the third bottom portion, wherein the seat system further includes a first step connecting the first bottom portion and the second bottom portion, and a second step connecting the second bottom portion and the third bottom portion, wherein the fourth seat body includes a fourth back support body, a fourth hip support body, and a fourth leg support body, wherein the fourth back support body is positioned above the second body bottom portion, the fourth hip support body is positioned on the second body bottom portion, and the fourth leg support body is positioned below the second body bottom portion and above the third bottom portion, wherein the second body bottom portion is positioned above the third bottom portion, wherein the fourth seat body is oriented perpendicular to the first corridor such that the second body bottom portion is positioned directly above the first corridor and parallel to the first corridor to ensure that a height of the first corridor is sufficient to allow a person to walk in a standing position.

2. The seat system for an airplane of claim 1, wherein the second accommodation body includes a third side wall disposed to be vertical to a plane head direction of the airplane body, a second rear wall of which one portion is connected to the third side wall, a fourth side wall connected to the second rear wall and disposed to be parallel to the third side wall, and a second body door coupled to any one of the third side wall and the fourth side wall to be openable/closable.

3. The seat system for an airplane of claim 1, wherein the fourth seat unit further includes a second support post provided in the second accommodation body.

4. The seat system for an airplane of claim 1, wherein the second accommodation body further includes a monitor and a table provided in the second accommodation body.

* * * * *